United States Patent [19]
Kyllonen et al.

[11] Patent Number: 5,924,032
[45] Date of Patent: Jul. 13, 1999

[54] MOBILE TELEPHONE HAVING AN IMPROVED PROBABILITY OF RECEIVING AN INCOMING CALL

[75] Inventors: Jukka Kyllonen, Marynummi; Ilpo Mattila, Ruukki; Vesa Vuorio, Oulu, all of Finland

[73] Assignee: Nokia Mobile Phones Limited, Salo, Finland

[21] Appl. No.: 08/799,323

[22] Filed: Feb. 13, 1997

Related U.S. Application Data

[63] Continuation-in-part of application No. 08/719,172, Sep. 24, 1996.

[51] Int. Cl.$^6$ .................................................... H04Q 7/32
[52] U.S. Cl. ................................................ 455/434; 455/515
[58] Field of Search ........................... 455/458, 459, 455/460, 434, 515

[56] References Cited

U.S. PATENT DOCUMENTS

| | | | |
|---|---|---|---|
| H610 | 3/1989 | Focarile et al. | 455/31.2 |
| 4,242,538 | 12/1980 | Ito et al. | 455/422 |
| 4,399,555 | 8/1983 | MacDonald et al. | 455/33 |
| 5,177,780 | 1/1993 | Kasper et al. | 455/413 |
| 5,257,257 | 10/1993 | Chen et al. | 370/18 |
| 5,371,781 | 12/1994 | Ardon | 379/59 |
| 5,396,653 | 3/1995 | Kivari et al. | 455/88 |
| 5,451,839 | 9/1995 | Rappaport et al. | 375/224 |
| 5,465,401 | 11/1995 | Thompson | 455/558 |
| 5,517,673 | 5/1996 | Fehnel | 455/33.1 |
| 5,521,961 | 5/1996 | Fletcher et al. | 379/59 |
| 5,526,401 | 6/1996 | Roach, Jr. et al. | 455/422 |
| 5,539,748 | 7/1996 | Raith | 370/329 |

*Primary Examiner*—Dwayne D. Bost
*Assistant Examiner*—Alan T. Gantt
*Attorney, Agent, or Firm*—Perman & Green, LLP

[57] ABSTRACT

A mobile station (10) includes a transceiver (14, 16) for receiving information from and for transmitting information to a control channel of a wireless communications system. The mobile station further includes a controller (18) that is bidirectionally coupled to a memory (24) and to the transceiver. The controller executes instructions for implementing a plurality of tasks, including an initialization task, a system access task, an idle task, and a response to an incoming call task. In accordance with the teachings of this invention, the controller is responsive to a receipt of a page message that identifies the mobile station, when executing the initialization task or the system access task, for storing an indication of the receipt of the received page message in the memory. The controller is further responsive to a presence of a stored indication, after entering the idle task, for exiting the idle task and entering the task that responds to the incoming call associated with the stored indication of the receipt of the page message.

11 Claims, 10 Drawing Sheets

MOBILE TELEPHONE HAVING AN IMPROVED PROBABILITY OF RECEIVING AN INCOMING CALL

CROSS-REFERENCE TO A RELATED PATENT APPLICATION

This patent application is a continuation-in-part of copending U.S. patent application Ser. No. 08/719,172, filed Sep. 24, 1996, entitled "Mobile Telephone Having an Improved Probability of Receiving an Incoming Call", by Jukka Kyllönen.

FIELD OF THE INVENTION

This invention relates generally to mobile telephones and, in particular, to mobile telephones or mobile stations that perform system initialization and system access tasks when operating with a cellular system.

BACKGROUND OF THE INVENTION

In a cellular system of most interest to this invention the channel from a base station to the mobile station is referred to as the forward channel, i.e., the forward control channel and the forward voice channel. The channel from the mobile station to the base station is referred to as the reverse channel, i.e., the reverse control channel and the reverse voice channel. The system may have one or more forward control channels defined as combined paging and access channels on which the mobile station receives page messages, indicating that an incoming call has been received for the mobile station, and system access parameters needed to access the cellular system.

In conventional practice (e.g., TIA/EIA/IS-91 (AMPS)), and when entering a system access task, the mobile station scans its receiver to identify the two strongest received access channels. The mobile station then registers into the paging area having the strongest access channel, from which it can read overhead information sent on a forward access channel. If the mobile station cannot read and decode the data successfully, it switches to the second strongest channel and tries to complete the task there.

Figure 3A:
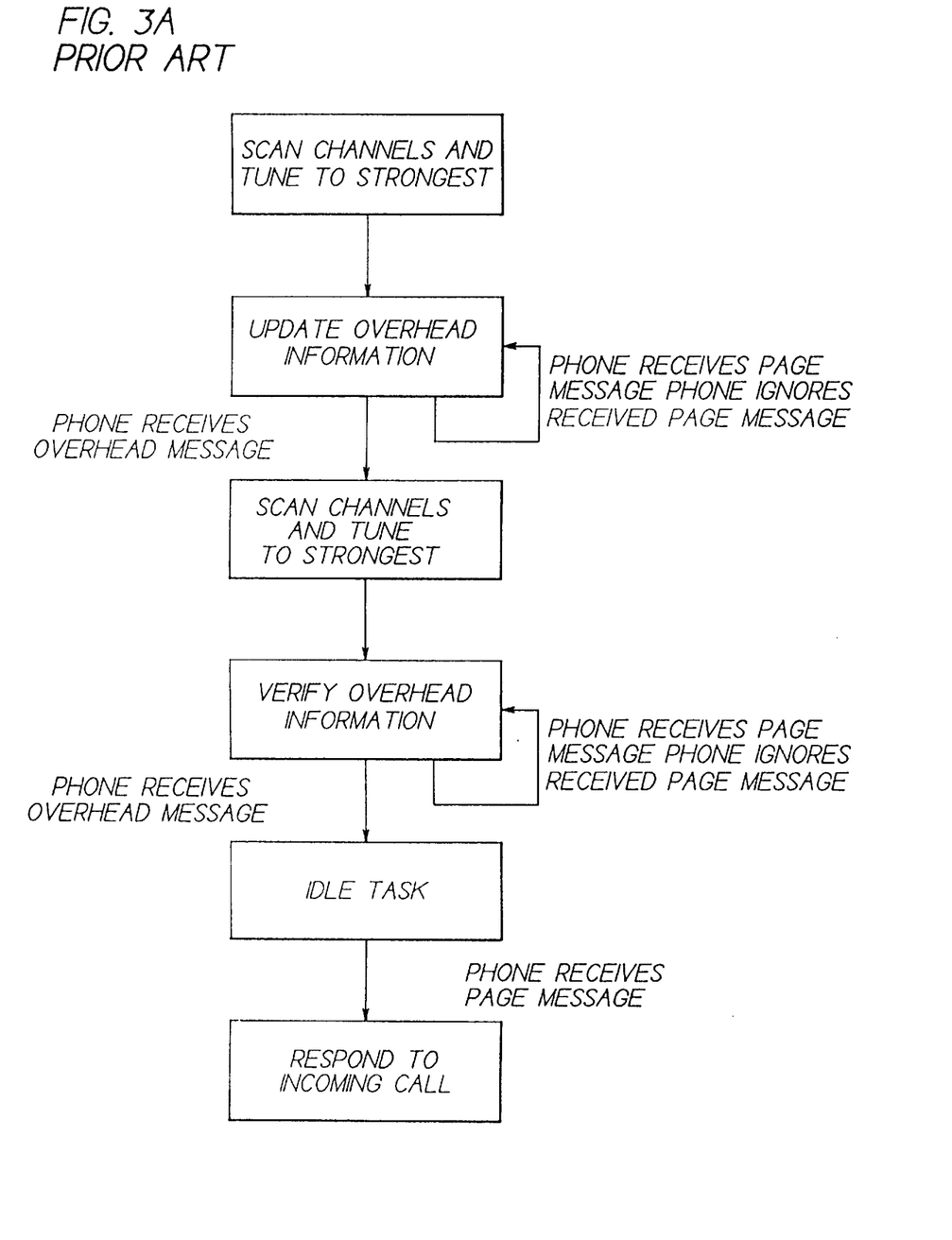
FIG. 3A is a logic flow diagram that illustrates the operation of the mobile station during a conventional Initialization Task.

During an Initialization Task, and referring to FIG. 3A, in accordance with TIA/EIA/IS-91, the mobile station waits for an overhead message from a base station in two separate sub-tasks, specifically an Update Overhead Information Task (TIA/EIA/IS-91, section 2.6.1.1.2) and a Verify Overhead Information Task (section 2.6.1.2.2). Both of these sub-tasks can last up to three seconds.

Figure 4A:
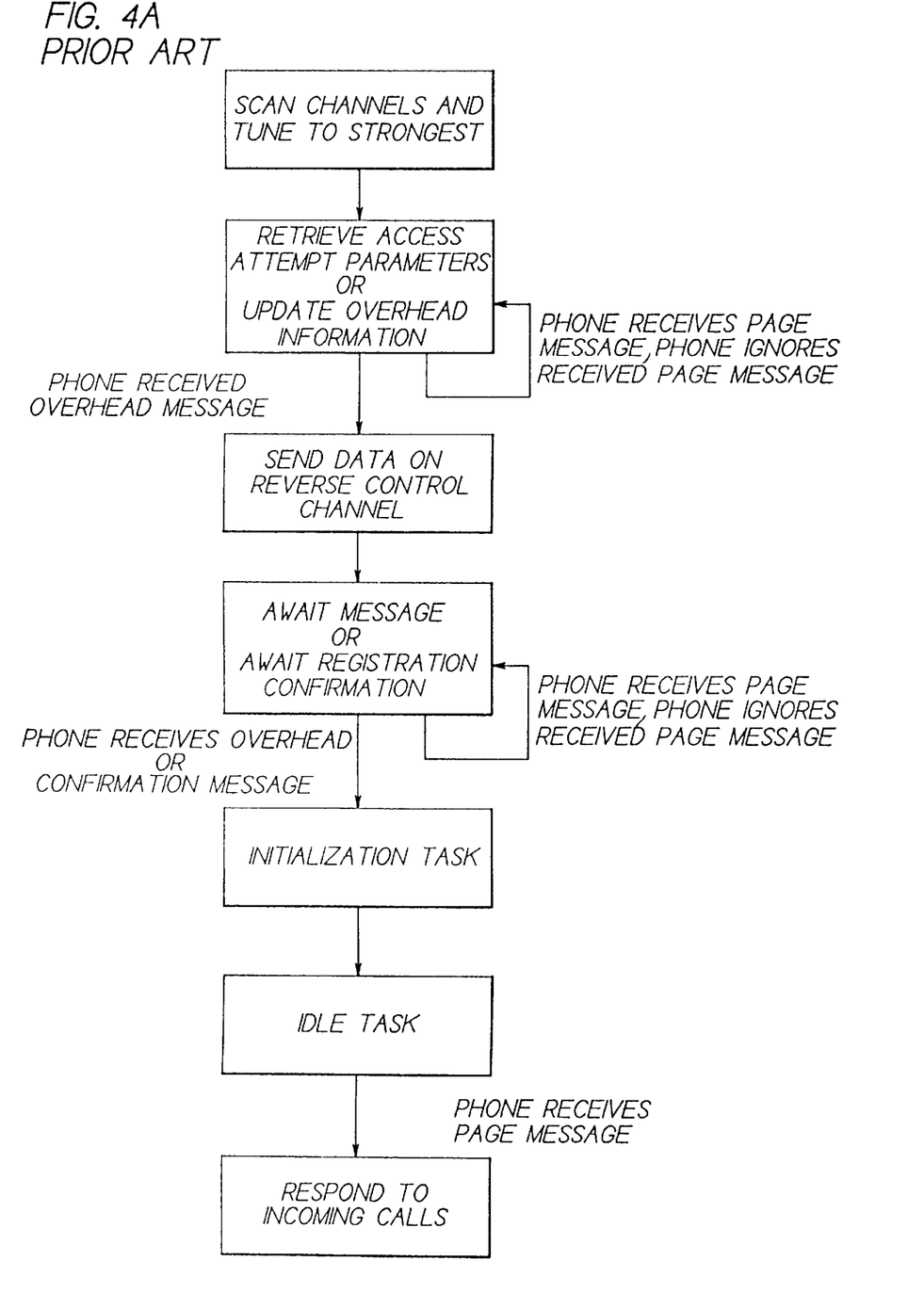
FIG. 4A is a logic flow diagram that illustrates the operation of the mobile station during a conventional System Access Task.

During a System Access Task, and referring to FIG. 4A, the mobile station executes four sub-tasks, specifically a Retrieve Access Attempt Parameters Task (section 2.6.3.3, which can last up to 1.1 seconds), an Update Overhead Information Task (section 2.6.3.4, which can last up to 1.5 seconds), an Await Message Task (section 2.6.3.8, which can last up to 10 seconds for a Base Station Challenge and up to 5 seconds for other access types), and an Await Registration Confirmation Task (section, 2.6.3.9, which can last up to 5 seconds).

As is indicated in FIGS. 3A and 4A, during both the Initialization and System Access Tasks, respectively, the mobile station may receive a page message on the paging/access channel. However, as currently specified the mobile station ignores any page messages that are received at this time. That is, the mobile station does not respond to a received page message until after the completion of the Initialization or System Access Tasks, that is until entering an Idle Task. Only at this time is the mobile station enabled to respond to an incoming call.

As can be appreciated, a significant period of time can elapse before the mobile station enters the Idle Task and can respond to a next page message (e.g., up to 20+ seconds when in the System Access Task). As a result, the mobile station may not be able to respond to a page message, resulting in a missed call.

OBJECTS OF THE INVENTION

It is a first object of this invention to provide an improved method for operating a mobile station with a cellular system so as to increase the probability that the mobile station will respond to an incoming (mobile terminated) call.

It is a second object of this invention to provide an improved mobile station that stores an indication of a receipt of page message that is received while in an Initialization or System Access Task, such that the mobile station is enabled to subsequently exit an Idle Task and thus respond to the incoming call.

SUMMARY OF THE INVENTION

The foregoing and other problems are overcome and the objects of the invention are realized by a mobile station operable with a wireless communications system, and by methods for operating the mobile station.

In accordance with this invention the mobile station includes a transceiver for receiving information from and for transmitting information to a control channel of the wireless communications system. The mobile station further includes a controller that is bidirectionally coupled to a memory and to the transceiver. The controller executes instructions for implementing a plurality of tasks, including an initialization task, a system access task, an idle task, and a response to an incoming call task.

In accordance with the teachings of this invention, the controller is responsive to a receipt of a page message that identifies the mobile station, when executing the initialization task or the system access task, for storing an indication of a receipt of the page message in the memory. The indication may be a flag bit that is selectively disabled or reset before entering the initialization or system access tasks, and that is then enabled or set upon the receipt of a page message that is directed to the mobile station. The controller is further responsive to a presence of the stored indication, after entering the idle task, for exiting the idle task and entering the task that responds to the incoming call associated with the stored page message indication.

In a presently preferred air interface standard the initialization task is comprised of at least one of an Update Overhead Information sub-task and a Verify Overhead Information sub-task, and the system access task is comprised of at least one of a Retrieve Access Attempt Parameters sub-task, an Update Overhead Information sub-task, an Await Message sub-task, and an Await Registration Confirmation sub-task.

The controller is further responsive to a lack of a stored page message indication, after entering the idle task, for remaining in the idle task and monitoring the control channel for a page message that is directed to the mobile station.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

FIGS. 1A, 2, 3A, 3B, 4A and 4B are all present in the above-referenced U.S. patent application Ser. No. 08/719,172, filed Sep. 24, 1996, while FIGS. 1B, 3C, 4C and 5 illustrate the invention that forms the subject matter of this continuation-in-part application. Before describing these latter Figures, a description will first be made of the former Figures so as to provide a context for the description of the present invention.

Figure 1A:
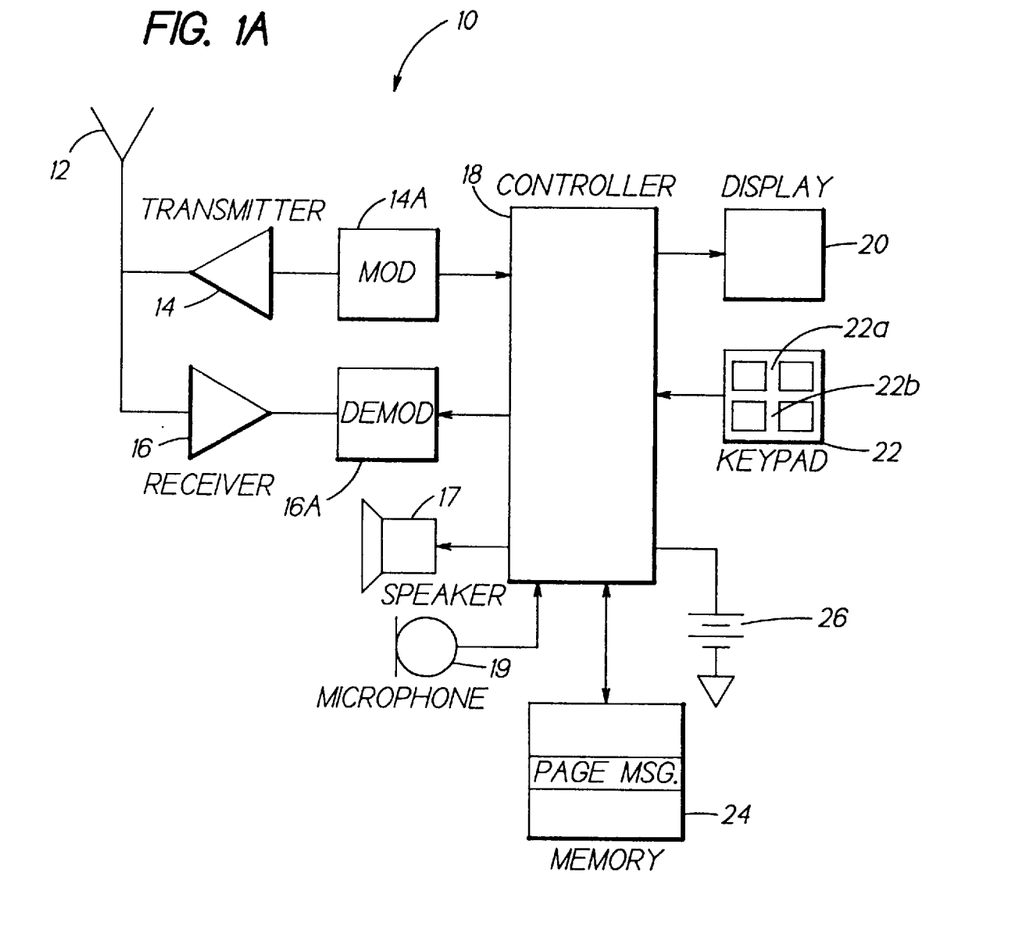
FIG. 1A is a block diagram of a first embodiment of a mobile station.
Figure 2:
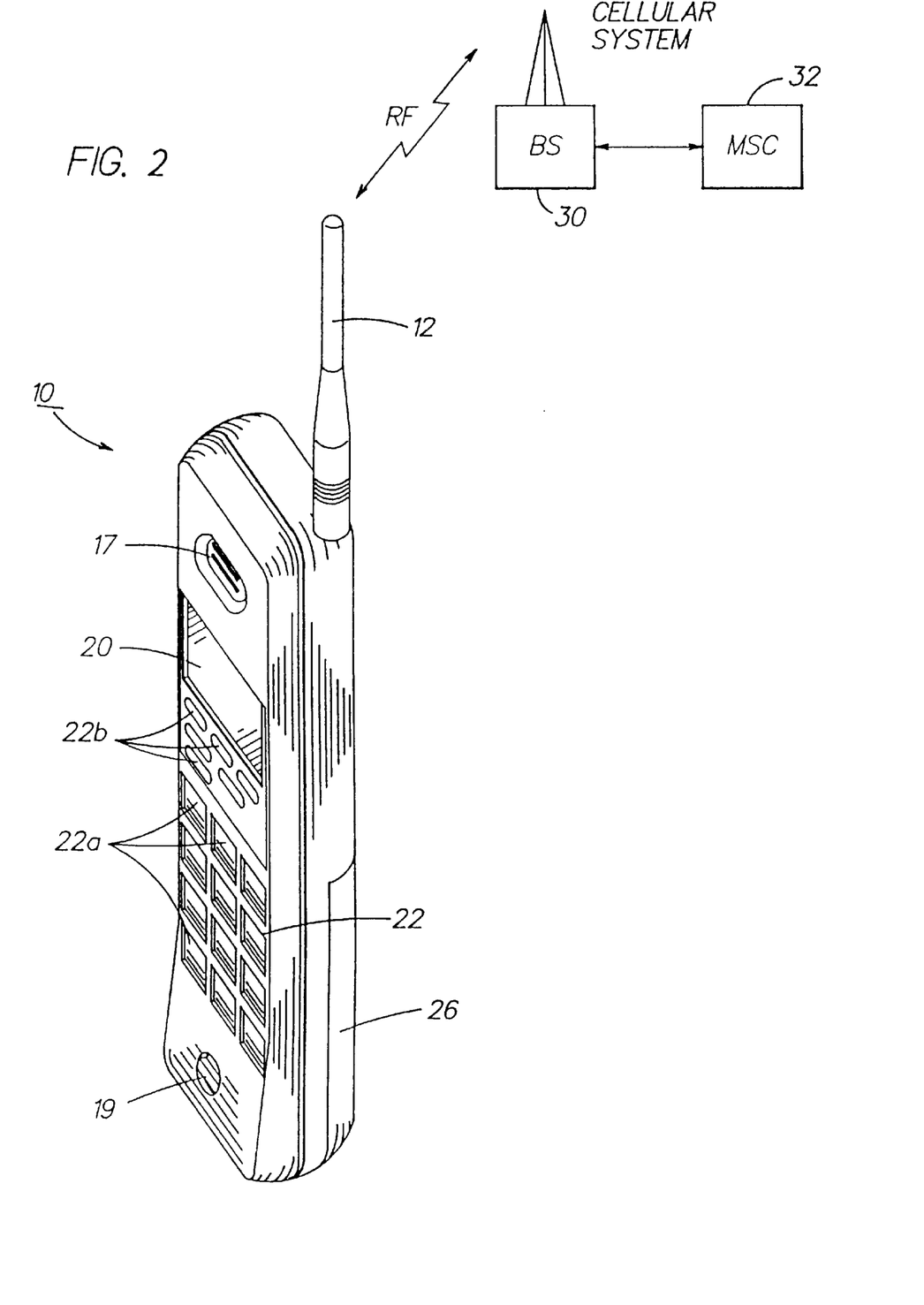
FIG. 2 is an elevational view of the mobile station shown in FIGS. 1A and 1B, and which further illustrates a cellular communication system to which the mobile station is bidirectionally coupled through wireless RF links.

Reference is made to FIGS. 1A and 2 for illustrating a wireless user terminal or mobile station 10, such as but not limited to a cellular radiotelephone or a personal communicator. The mobile station 10 includes an antenna 12 for transmitting signals to and for receiving signals from a base site or base station 30. The base station 30 is bidirectionally connected to a Mobile Switching Center (MSC) 32, and provides a connection to landline trunks when the mobile station 10 receives or originates a call. When a call is received for the mobile station 10, a Page message is transmitted on the forward control channel to inform the mobile station of the received call. Reference with regard to a Page message can be had to TIA/EIA/IS-91, sections 2.6.2.2 and 3.7.1.1. Reference may also be had to EIA/TIA-553.

The mobile station includes a modulator (MOD) 14A, a transmitter 14 and a receiver 16 (i.e., a transceiver), a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a structure and protocol of a type that is described in TIA/EIA/IS-91, and any similar or related air interface standards, although the teaching of this invention is not intended to be limited only to this specific air interface standard, or for use only with an IS-91 compatible mobile station, or for use only in analog (i.e., FM) type systems.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device), the operating program including instructions for implementing the applicable air interface standard (e.g., TIA/EIA/IS-91), including the various tasks and sub-tasks that comprise the air interface standard.

It should be understood that the mobile station 10 can be a vehicle mounted or a handheld device. It should further be appreciated that the mobile station 10 can be capable of operating with two or more air interface standards, modulation types, and access types. By example, the mobile station may be capable of operating in accordance with a frequency modulated (FM), frequency division multiple access (FDMA) transmission and reception standard, such as is found in conventional 800 MHz public cellular systems (e.g., EIA/TIA-553), and improvements and modifications thereof. For a dual mode mobile station, operation may also occur as well, when operating on an analog control channel, with a phase modulated (PM), time division multiple access (TDMA) standard (such as EIA/TIA IS-136 or GSM), or a code division multiple access (CDMA) standard (such as EIA/TIA IS-95). Narrow-band AMPS (NAMPS), as well as TACS phones, may benefit from the teaching of this invention.

Figure 3B:
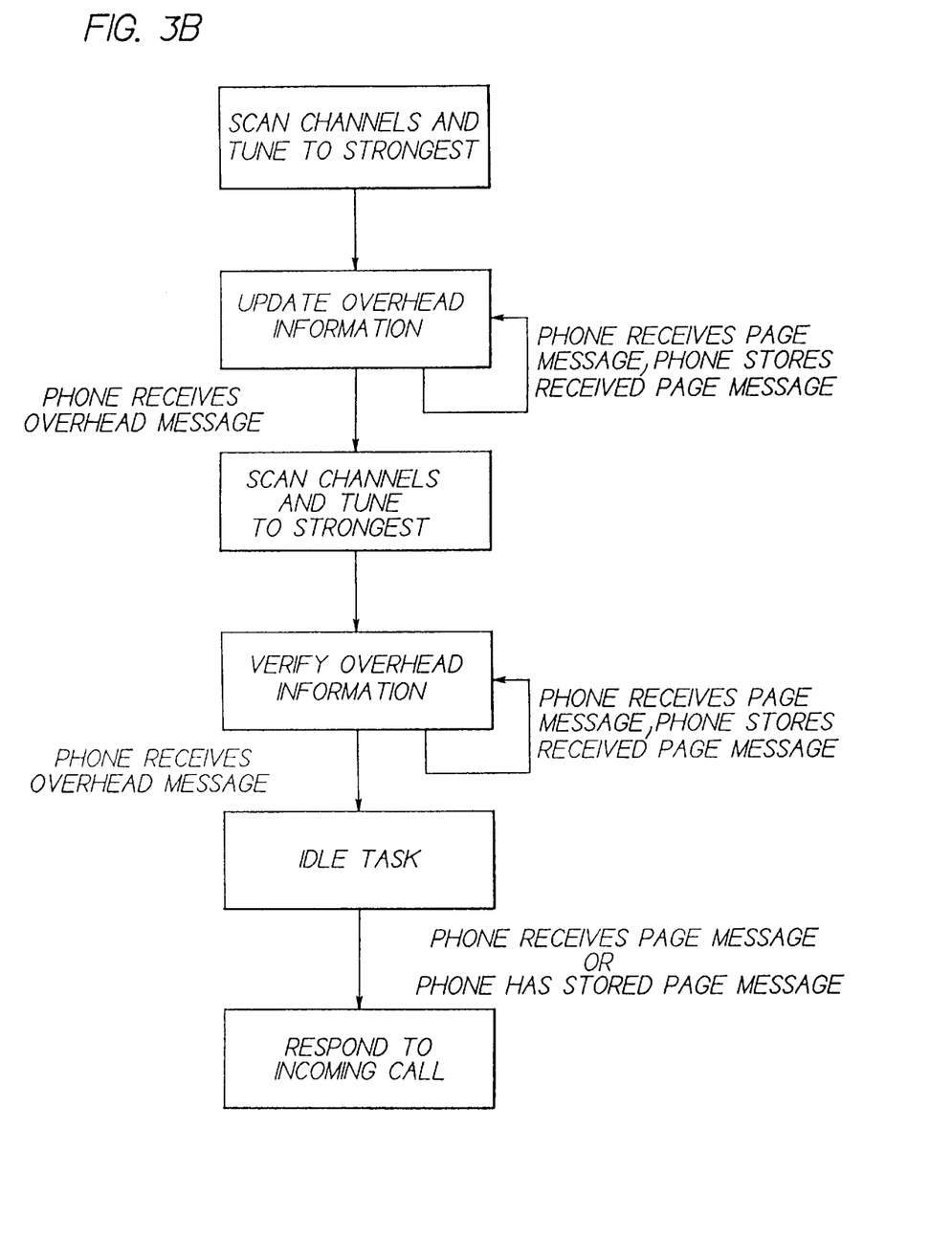
FIG. 3B is a logic flow diagram that illustrates the operation of the mobile station during an improved Initialization Task.
Figure 4B:
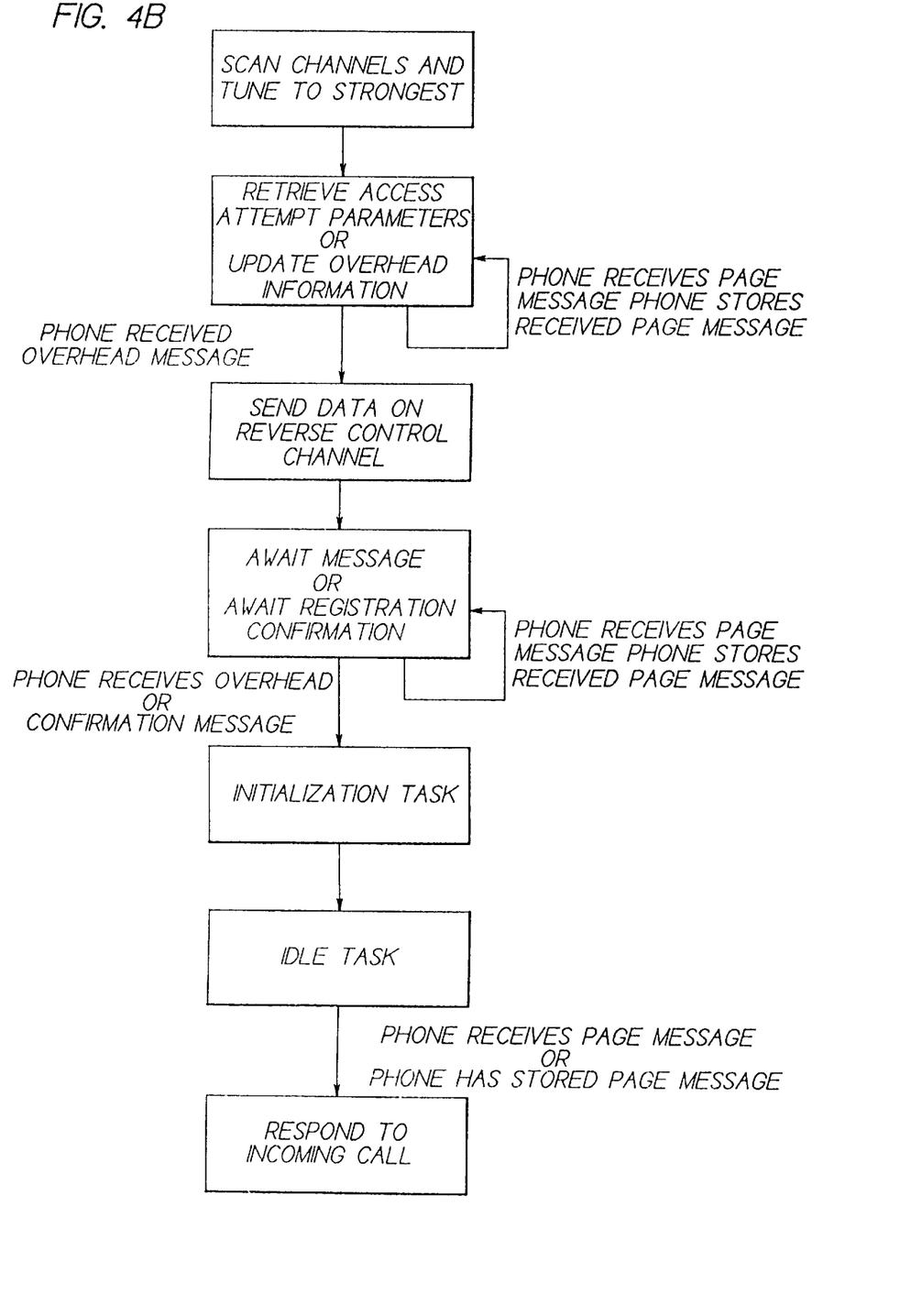
FIG. 4B is a logic flow diagram that illustrates the operation of the mobile station during an improved System Access Task.

Reference is now made to FIGS. 3B and 4B for illustrating embodiments of System Initialization and System Access Tasks, respectively, in accordance with the teaching of the invention disclosed in the above-referenced U.S. patent application Ser. No. 08/719,172, filed Sep. 24, 1996.

Referring first to FIG. 3B, and contrasting this Figure to FIG. 3A, it can be seen that the operation of the mobile station 10 is modified when in the Update Overhead Information and Verify Overhead Information sub-tasks so as to store a received page message into the memory 24 of FIG. 1A. That is, the mobile station 10 does not ignore a page message that is received while in one of these two sub-tasks. The operation of the mobile station 10 is also revised so as to make an immediate check upon entering the Idle Task as to whether a page message was stored while performing the initialization task. If No, the mobile station 10 remains in the Idle Task and monitors the paging channel for a page in a conventional manner. However, if it is determined that a page message was stored before entering the Idle Task, the mobile station 10 immediately exists the Idle Task and enters a task wherein the mobile station 10 responds to the incoming call. As can be appreciated, this operation of the mobile station 10 significantly reduces the probability that the mobile station 10 will miss an incoming call.

Reference is now made to FIG. 4B for illustrating the operation of the mobile station when in the system Access Task. In a manner similar to that described in FIG. 3B, the operation of the mobile station 10 is modified so as to store a received page message when operating in the Retrieve Access Attempt Parameters or Update Overhead Information or Await Message or Await Registration Confirmation sub-tasks. As is in FIG. 3B, when entering the Idle Task the mobile station 10 makes an immediate determination as to whether the mobile station 10 has stored a page message. If Yes, the mobile station immediately exits the Idle Task and responds to the incoming call. If no page message was stored before entering the Idle Task, the mobile station 10 remains in the Idle Task and monitors the paging channel in a conventional manner.

It should be noted in FIG. 4B that the Initialization Task of FIG. 3B is inserted between the Await Message or Await Registration Confirmation sub-tasks and the Idle Task. As such, the mobile station 10 may also store a page message in this block as is shown in greater detail in FIG. 3B.

If the mobile station 10 ends up in the conversation state after exiting the Idle Task, the stored page message is cleared or erased from the memory 24.

Although the foregoing description refers to immediately checking for a stored page message when entering the Idle Task, and immediately exiting the Idle Task if such a stored page message is detected, it should be understood that the mobile station 10 may perform some number of operations before checking for the stored page message and/or exiting the Idle Task. That is, it is not required that the mobile station respond immediately to the presence of the stored page message.

It should further be realized that, in accordance with an aspect of the present invention, the storage of the page message need not imply that the actual received page message is stored, but instead that the mobile station 10 detects that a received page message is directed to the mobile station (i.e., by comparing the mobile identification number (MIN) of the received page message to the internally stored MIN) and, upon detecting a match, the mobile station 10 then sets or enables a flag or some other indicator.

Figure 1B:
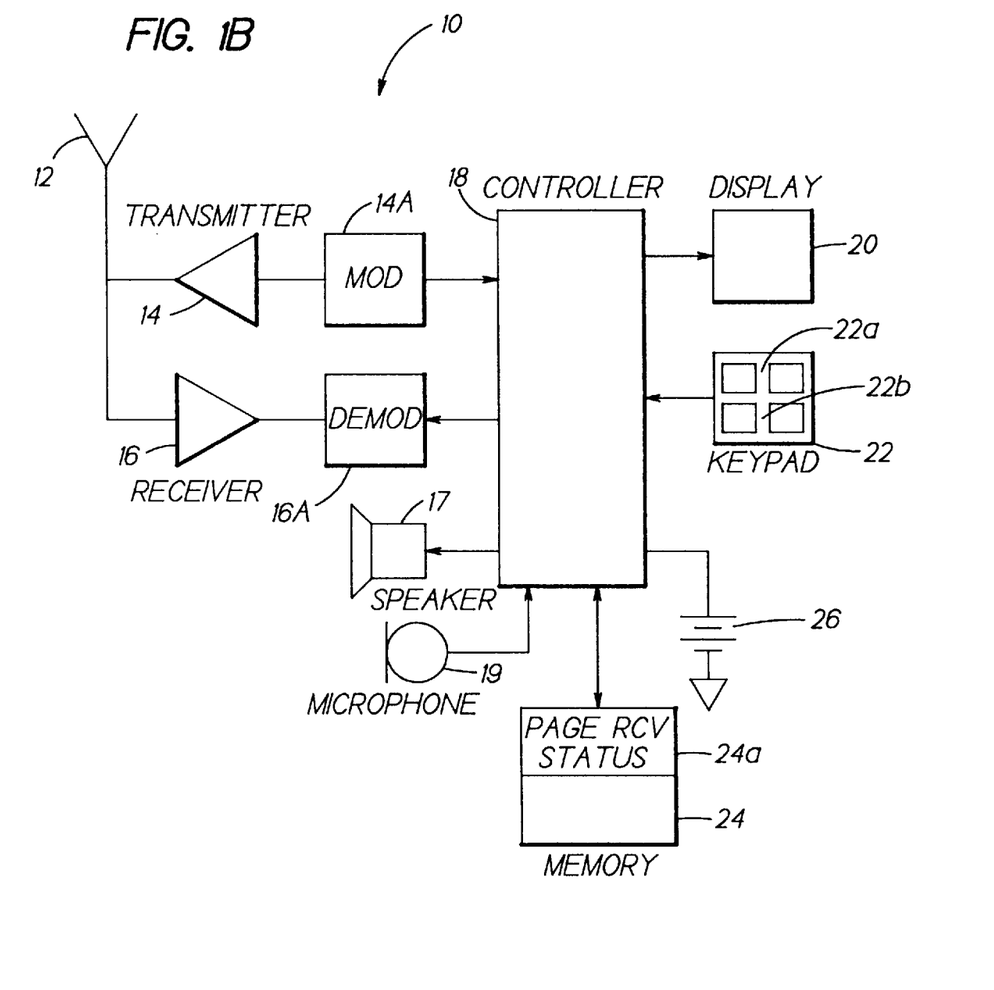
FIG. 1B is a block diagram of a second embodiment of a mobile station that is constructed and operated in accordance with this invention.
Figure 3C:
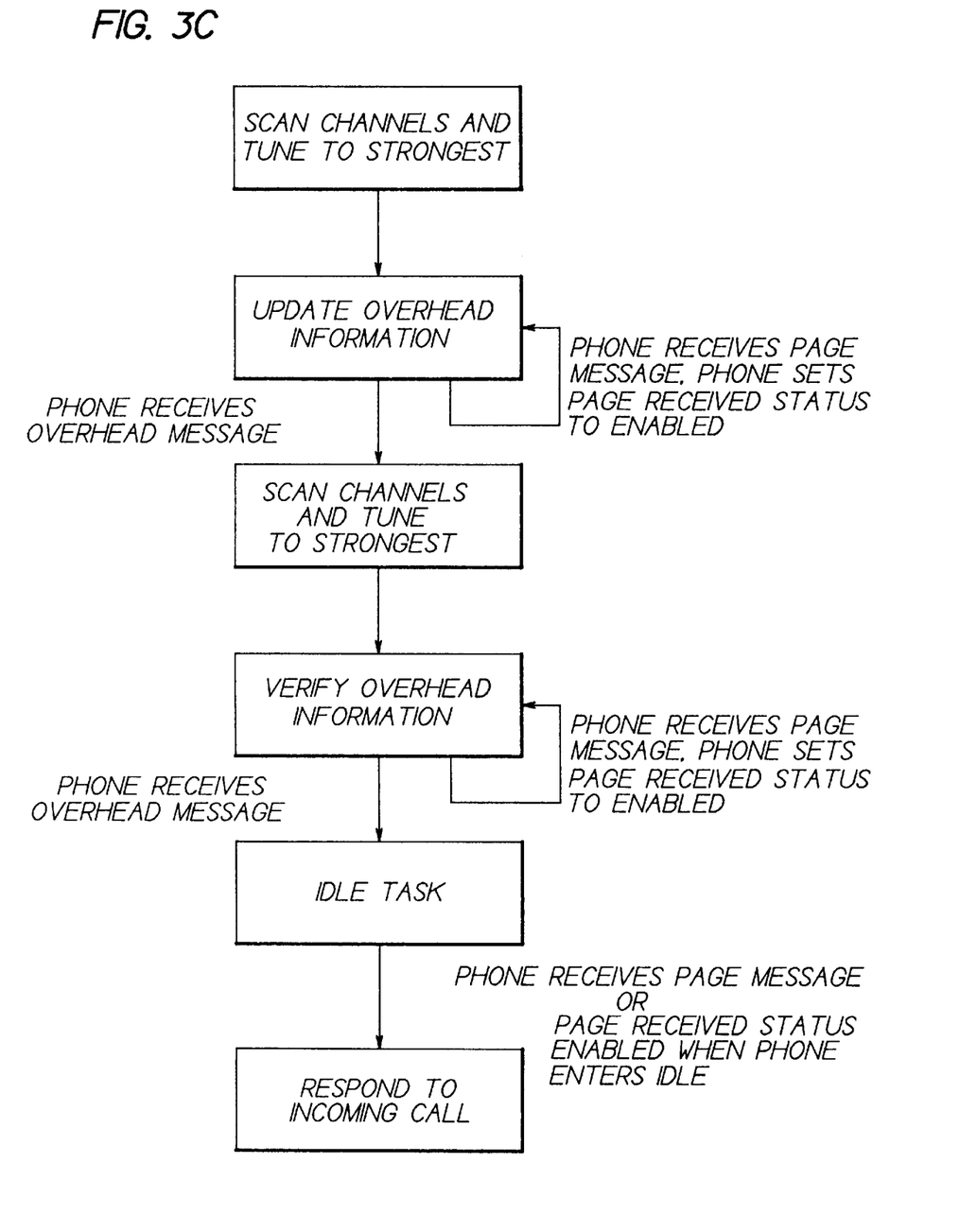
FIG. 3C is a logic flow diagram that illustrates the operation of the mobile station, in accordance with an embodiment of this invention, during an improved Initialization Task.
Figure 4C:
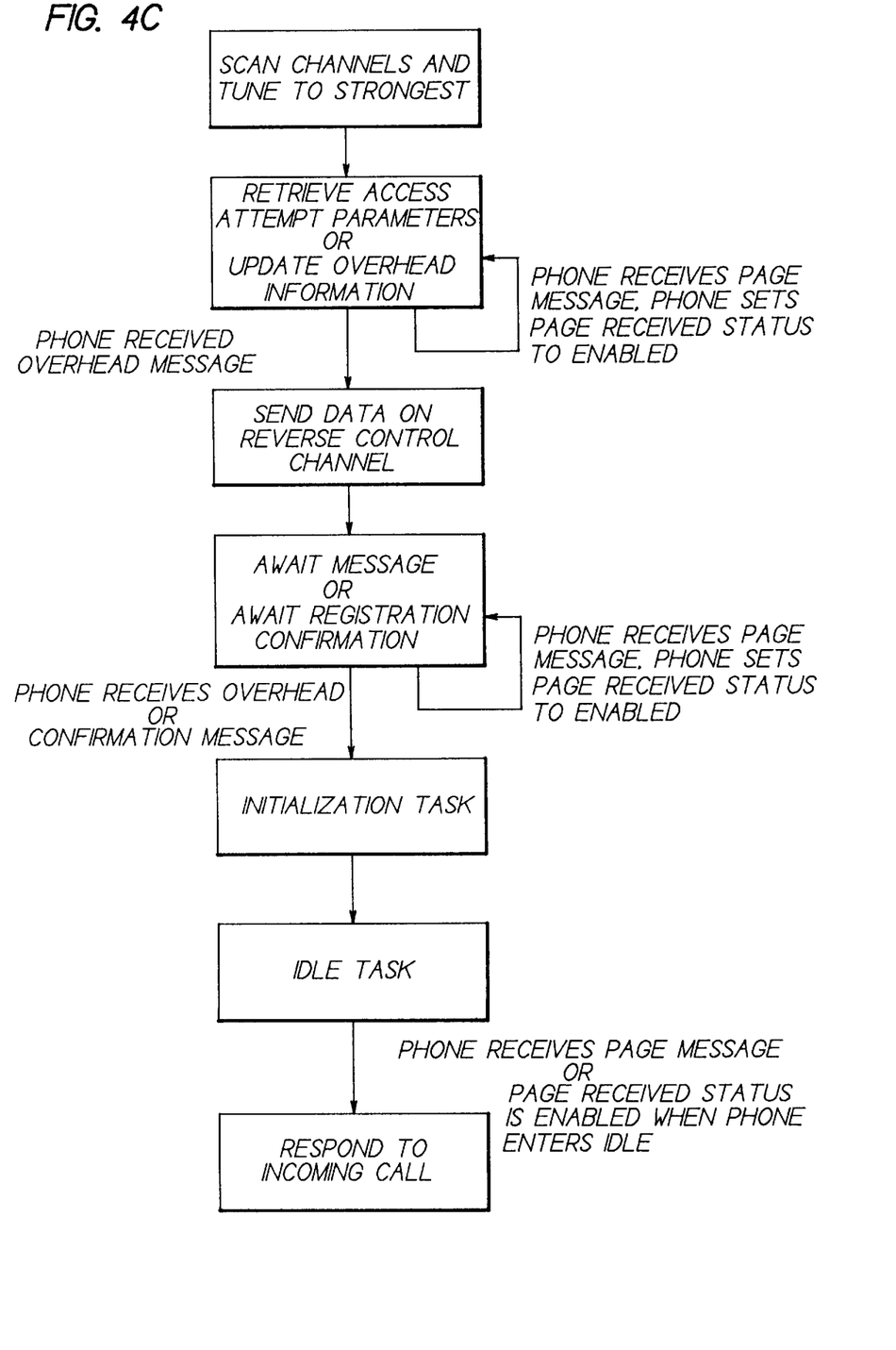
FIG. 4C is a logic flow diagram that illustrates the operation of the mobile station, in accordance with the embodiment of this invention, during an improved System Access Task.

In this regard reference can be had to FIG. 1B, wherein it can be seen that the memory 24 is modified so as to include a Page Received Status (PAGE RCV STATUS) flag 24a. This can be a one bit flag or a multi-bit flag. In all other respects the construction of the mobile station 10 can be the same as in FIG. 1A. Referring also to FIGS. 3C and 4C it can be seen that the operation of the mobile station 10 is modified so as to enable or set the page received status flag 24a upon detecting that a received page message is directed to the mobile station 10, and is further modified to exit the Idle Task if it is found after entering the Idle Task that the page received status flag 24a is enabled or set. The page received status flag 24a is set if a page message has a $MIN1_r$ that matches the mobile station's $MIN1_p$ (for one word messages), or if both $MIN1_r$ and $MIN2_r$ match the mobile station's $MIN1_p$ and $MIN2_p$, respectively, for a two word page message. All decoded MIN bits must match to cause the mobile station 10 to respond to the page message and enable the page received status flag 24a.

Figure 5:
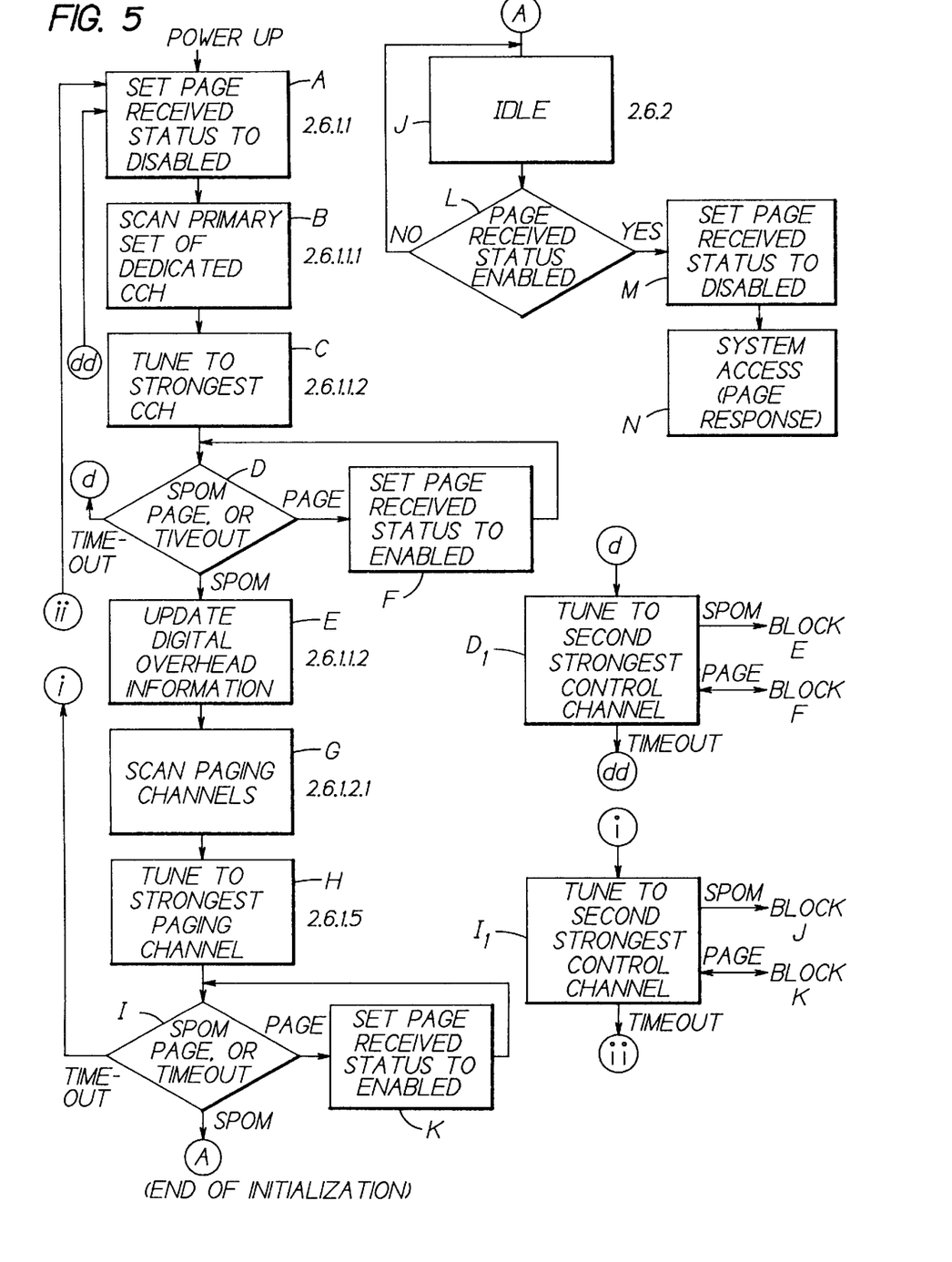
FIG. 5 is more detailed logic flow diagram of the improved Initialization Task in accordance with this invention.

Reference can now be made to FIG. 5 for illustrating in greater detail the System Initialization Task in accordance with this invention. The numbers (e.g., 2.6.1.1) that are adjacent to certain of the blocks refer to relevant section numbers of TIA/EIA/IS-91.

At power up the mobile station 10 enters Block A, wherein the page received status flag 24a is reset or disabled. At Block B the mobile station 10 scans the primary set of dedicated control channels (DCCH), and at Block C tunes to the strongest channel. At Block D the mobile station 10 determines if a System Parameter Overhead Message (SPOM) has been received, or if a page message has been received, or if a timeout (e.g., three seconds) has occurred. If the SPOM is received control passes to Block E.

In accordance with this invention, if a page message is received (that is directed to the mobile station 10) while in Block D, control passes instead to Block F where the page received status flag 24a is enabled or set. Control then passes back to Block D to await either the receipt of the SPOM or the occurrence of the timeout.

If a timeout occurs in Block D, indicating that the mobile station 10 cannot complete this task on the strongest dedicated control channel (DCCH), the mobile station enters Block $D_1$ where it tunes to the second strongest dedicated control channel and attempts to complete the task within a second time out interval (e.g., 3 seconds). The System Identification (SID) fields are preferably used to insure that the mobile station 10 selects the two control channels from the same system. The mobile station 10 enters the Scan Primary Set of Dedicated Control Channels (Block B), after first transitioning through Block A, as shown in FIG. 5, upon the occurrence of the timeout. If the mobile station cannot complete the task on either of the two strongest control channels, the mobile station may check the Serving-System status. If the Serving-System is enabled, it may be disabled: if the Serving-System status is disabled, it may be enabled. If the SPOM is received while in Block $D_1$, the mobile station 10 enters Block E. If a page message is received, and in accordance with this invention, the mobile station enters Block F, from which it returns after setting the page received status flag 24a.

Assuming that the SPOM is received, at Block E the mobile station 10 updates the digital overhead information, scans the paging channels at Block G, and then tunes to the strongest paging channel at Block H. At Block I the mobile station 10 determines if a SPOM has been received, or if a page message has been received, or if a timeout has occurred. If the SPOM is received control passes to the Idle Task at Block J, which ends the Initialization Task.

Further in accordance with this invention, if a page message is received (that is directed to the mobile station 10) control passes instead to Block K where the page received status flag 24a is enabled or set. Control then passes back to Block I to await either the receipt of the SPOM or the occurrence of the timeout.

If a timeout occurs in Block I, the mobile station 10 enters Block $I_1$, where the operation is as was described above with respect to Block $D_1$, and control eventually passes to one of Blocks A, K or J.

After entering the Idle Task at Block J, and further in accordance with this invention, the mobile station 10 subsequently determines at Block L if the page received status flag 24a is enabled or set. If No, control passes back to Block J to remain in the Idle Task and to monitor the paging channel to which the mobile station tuned at Block H. If it is instead determined that the page received status flag 24a is enabled at Block L, control passes to Block M where the page received status flag 24a is disabled (reset), and control then passes to the System Access Task at Block N to perform the page response.

Although described in the context of paging and access channels, it should be realized that the term "access channel" should be broadly read to include any channel on which the mobile station 10 may access the cellular system (e.g., for call origination, registration, response to pages, order responses, etc.), and the term "paging channel" should be broadly read to include any channel on which pages are sent to the mobile station.

The teaching of this invention should also not be construed to be limited for use with only one communications standard or specification, such as TIA/EIA-IS-91 or TIA/EIA/IS-553.

Thus, although the invention has been particularly shown and described with respect to preferred embodiments thereof, it will be understood by those skilled in the art that changes in form and details may be made therein without departing from the scope and spirit of the invention.

What is claimed is:

1. A method for operating a mobile station to perform an initialization procedure with a cellular system to improve the probability of receiving an incoming call, comprising the steps of:

performing at least one initialization sub-task that includes receiving information from a forward channel;

while performing the at least one initialization sub-task, storing in the mobile station an indication of a receipt of a page message that is directed to the mobile station, the page message indicating that the mobile station has an incoming call; and after exiting the initialization procedure, determining if the mobile station has stored the indication of a receipt of a page message and, if so, responding to the incoming call.

2. The method as set forth in claim 1, wherein the initialization procedure comprises at least one of an Update Overhead Information sub-task and a Verify Overhead Information sub-task.

3. A method for operating a mobile station to perform a system access procedure with a cellular system to improve the probability of receiving an incoming call, comprising the steps of:

performing at least one system access sub-task that includes receiving information from a forward channel;

while performing the at least one system access sub-task, storing in the mobile station an indication of a receipt of a page message that is directed to the mobile station, the page message indicating that the mobile station has an incoming call; and after exiting the system access procedure, determining if the mobile station has stored the indication of the receipt of the page message and, if so, responding to the incoming call.

4. The method as set forth in claim 3, wherein the system access procedure comprises at least one of a Retrieve Access Attempt Parameters sub-task, an Update Overhead Information sub-task, an Await Message sub-task, and an Await Registration Confirmation sub-task.

5. A mobile station operable with a wireless communications system to improve the probability of receiving an incoming call, comprising:

a receiver for receiving information from a forward channel of the wireless communications system; and a controller that is bidirectionally coupled to a memory and to said receiver, said controller executing instructions for implementing a plurality of tasks, including an initialization task, a system access task, an idle task, and a response to an incoming call task, said controller being responsive to a receipt of a page message that identifies said mobile station, when executing said initialization task or said system access task, for storing an indication of the receipt of a page message in said memory, said controller further being responsive to a presence of a stored indication, after entering said idle task, for exiting said idle task and entering said task that responds to the incoming call associated with said stored page message.

6. The mobile station as set forth in claim 5, wherein the initialization task comprises at least one of an Update Overhead Information sub-task and a Verify Overhead Information sub-task.

7. The mobile station as set forth in claim 5, wherein the system access task comprises at least one of a Retrieve Access Attempt Parameters sub-task, an Update Overhead Information sub-task, an Await Message sub-task, and an Await Registration Confirmation sub-task.

8. The mobile station as set forth in claim 5, wherein said controller is further responsive to a lack of a stored indication, after entering said idle task, for remaining in said idle task and monitoring the same or a different forward channel for a page message that is directed to said mobile station.

9. The mobile station as set forth in claim 5, said initialization task comprising at least one of an Update Overhead Information sub-task and a Verify Overhead Information sub-task; said system access task comprising at least one of a Retrieve Access Attempt Parameters sub-task, an Update Overhead Information sub-task, an Await Message sub-task, and an Await Registration Confirmation sub-task; and said controller being further responsive to a lack of a stored indication, after entering said idle task, for remaining in said idle task and monitoring the same or a different forward channel for a page message that is directed to said mobile station.

10. The method for operating a mobile station that is bidirectionally coupled to a base station of a cellular communications system to improve the probability of receiving an incoming call, comprising the steps of:

prior to entering an Idle Task to monitor a forward channel for a receipt of a page message that identifies the mobile station, tuning the mobile station to a forward channel to receive system control information;

while waiting to receive the system control information, detecting the receipt of a page message that identifies the mobile station;

in response to detecting the receipt of a page message that identifies the mobile station, enabling a flag in a memory of the mobile station;

after receiving the system control information, entering the Idle Task; and after entering the Idle Task, determining if the flag is enabled and, if it is determined that the flag is enabled, exiting the idle task and entering a System Access Task to respond to the page message.

11. A method for operating a mobile station that is bidirectionally coupled to a base station of a radio communications system to improve the probability of receiving an incoming call, comprising the steps of:

prior to entering an Idle Task to monitor a forward channel for a receipt of a message that indicates the mobile station has an incoming call, tuning a receiver of the mobile station to a strongest forward control channel to receive system information;

while waiting to receive system information from the strongest forward control channel, detecting the receipt of the message that indicates that the mobile station has an incoming call;

in response to detecting the receipt of the message, setting a flag in a memory of the mobile station;

after receiving the system information, entering the Idle Task; and after entering the Idle Task, determining if the flag is set and, if it is determined that the flag is set, exiting the Idle Task and responding to the message, wherein, while waiting to receive the system information from the strongest forward control channel, detecting a timeout condition and, in response to detecting the timeout condition;

tuning the receiver of the mobile station to a next strongest forward control channel to receive the system information;

while waiting to receive the system information from the next strongest forward control channel, detecting the receipt of the message that indicates that the mobile station has an incoming call;

in response to detecting the receipt of the message, setting the flag in a memory of the mobile station;

after receiving the system information, entering the Idle Task; and after entering the Idle Task, determining if the flag is set and, if it is determined that the flag is set, exiting the Idle Task and responding to the message.

* * * * *